(12) United States Patent
Kumabe et al.

(10) Patent No.: US 11,221,415 B2
(45) Date of Patent: Jan. 11, 2022

(54) POSITIONING DEVICE AND POSITIONING METHOD

(71) Applicant: DENSO CORPORATION, Kariya (JP)

(72) Inventors: Seigou Kumabe, Kariya (JP); Watanyoo Chitmant, Kariya (JP)

(73) Assignee: DENSO CORPORATION, Kariya (JP)

( * ) Notice: Subject to any disclaimer, the term of this patent is extended or adjusted under 35 U.S.C. 154(b) by 30 days.

(21) Appl. No.: 16/708,707

(22) Filed: Dec. 10, 2019

(65) Prior Publication Data

US 2020/0110182 A1 Apr. 9, 2020

Related U.S. Application Data

(63) Continuation of application No. PCT/JP2018/012620, filed on Mar. 28, 2018.

(30) Foreign Application Priority Data

Jul. 7, 2017 (JP) .............................. JP2017-133972

(51) Int. Cl.
| | |
|---|---|
| G01S 19/28 | (2010.01) |
| G01S 19/22 | (2010.01) |
| G01S 19/25 | (2010.01) |
| G01S 19/11 | (2010.01) |
| G01S 19/51 | (2010.01) |

(52) U.S. Cl.
CPC .............. *G01S 19/28* (2013.01); *G01S 19/22* (2013.01); *G01S 19/254* (2013.01); *G01S 19/115* (2019.08); *G01S 19/51* (2013.01)

(58) Field of Classification Search
CPC ........ G01S 19/28; G01S 19/115; G01S 19/22; G01S 19/254; G01S 19/51; G01S 19/42; G01S 19/00; G01S 19/428

USPC .............. 342/357.67, 357.2, 357.25, 357.61, 342/357.34

See application file for complete search history.

(56) References Cited

U.S. PATENT DOCUMENTS

| | | | | |
|---|---|---|---|---|
| 7,728,768 | B2 * | 6/2010 | Mitsunaga | G01S 19/22 342/357.61 |
| 7,817,086 | B2 * | 10/2010 | Sugimoto | G01S 19/20 342/357.25 |
| 7,884,759 | B2 * | 2/2011 | Mitsunaga | G01S 19/22 342/357.25 |
| 7,924,219 | B2 * | 4/2011 | Mizuochi | G01S 19/32 342/357.2 |
| 7,965,229 | B2 * | 6/2011 | Mizuochi | G01S 19/40 342/357.23 |

(Continued)

FOREIGN PATENT DOCUMENTS

| | | |
|---|---|---|
| JP | 2005326235 A | 11/2005 |
| JP | 2013108961 A | 6/2013 |
| JP | 2016020812 A | 2/2016 |

*Primary Examiner* — Chuong P Nguyen
(74) *Attorney, Agent, or Firm* — Harness, Dickey & Pierce, P.L.C.

(57) ABSTRACT

A positioning device receives multiple positioning signals respectively transmitted from multiple positioning satellites, changes a condition of the positioning satellites to be used in a positioning calculation processing based on a determination of whether a surrounding environment is an environment in which a multipath is likely to occur, and performs the positioning calculation processing by using the positioning signals from the positioning satellites that satisfy the condition.

11 Claims, 8 Drawing Sheets

(56) References Cited

U.S. PATENT DOCUMENTS

| | | | | |
|---|---|---|---|---|
| 8,068,055 | B2* | 11/2011 | Yoshioka | G01S 19/42 |
| | | | | 342/357.67 |
| 8,154,447 | B2* | 4/2012 | Uchida | G01S 19/258 |
| | | | | 342/357.67 |
| 8,670,927 | B2* | 3/2014 | Watanabe | G01S 19/42 |
| | | | | 701/412 |
| 9,798,017 | B2* | 10/2017 | Zhodzishsky | G01S 19/04 |
| 10,365,109 | B2* | 7/2019 | Kumabe | G01C 21/165 |
| 10,732,299 | B2* | 8/2020 | Kumabe | G01S 19/52 |
| 2005/0253755 | A1 | 11/2005 | Gobara | |
| 2018/0252818 | A1* | 9/2018 | Sato | G01S 19/071 |
| 2020/0124739 | A1* | 4/2020 | Kumabe | G01S 5/011 |

\* cited by examiner

| CATEGORY | QZS CAPTURE STATUS | |
| --- | --- | --- |
| | UNCAPTURED | BEING CAPTURED |
| C4 | Dth4 | 0.8*Dth4 |
| C3 | Dth3 | 0.8*Dth3 |
| C2 | Dth2 | 0.8*Dth2 |
| C1 | Dth1 | 0.8*Dth1 |

POSITIONING DEVICE AND POSITIONING METHOD

CROSS REFERENCE TO RELATED APPLICATIONS

The present application is a continuation application of International Patent Application No. PCT/JP2018/012620 filed on Mar. 28, 2018, which designated the U.S. and claims the benefit of priority from Japanese Patent Application No. 2017-133972 filed on Jul. 7, 2017. The entire disclosures of all of the above applications are incorporated herein by reference.

TECHNICAL FIELD

The present disclosure relates to a positioning device and a positioning method.

BACKGROUND

In a technical field of a global positioning satellite system (GNSS), it has been known that an error can be included in position information as a result of calculation when a positioning device receives a positioning signal transmitted from a positioning satellite and reflected by buildings or the like (so-called multipath).

SUMMARY

According to an aspect of the present disclosure, multiple positioning signals respectively transmitted from multiple positioning satellites are received, a condition of the positioning satellites to be used in a positioning calculation processing is changed based on a determination of whether a surrounding environment is an environment in which a multipath is likely to occur, and the positioning calculation processing is performed by using the positioning signals from the positioning satellites that satisfy the condition.

BRIEF DESCRIPTION OF DRAWINGS

Objects, features and advantages of the present disclosure will become apparent from the following detailed description made with reference to the accompanying drawings. In the drawings.

DETAILED DESCRIPTION

Figure 1:
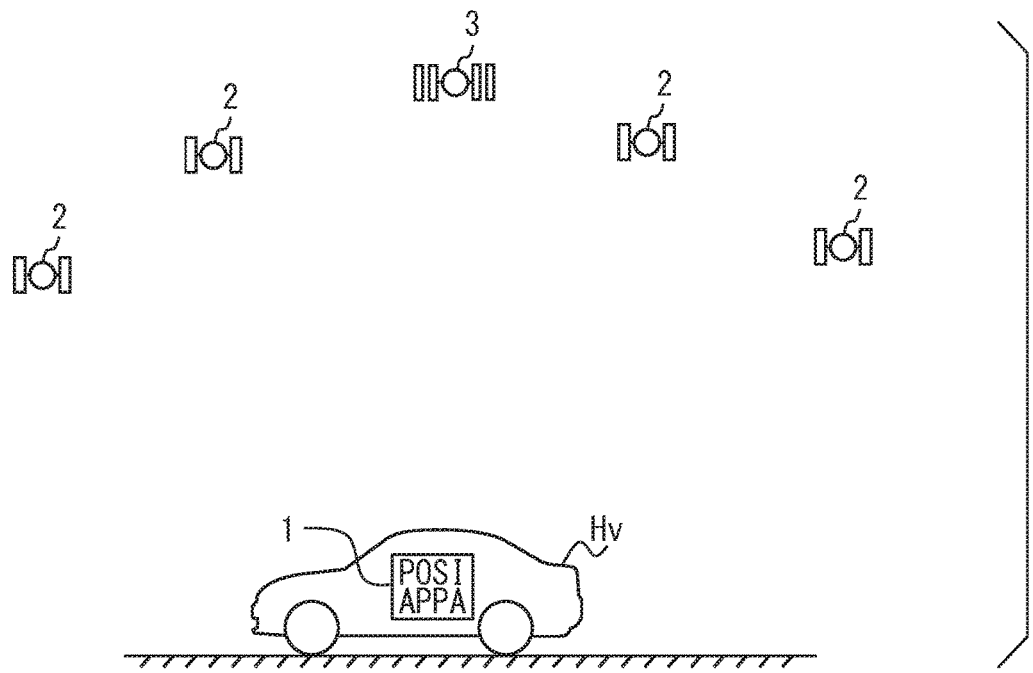
FIG. 1 is a diagram showing an example of a use mode of a positioning device.

For reducing a positioning error derived from a multipath, a positioning device may have a configuration in which a residual, which is a parameter indicating a magnitude of an error of a pseudo distance (hereinafter referred to as a pseudo distance residual), is calculated for each captured satellite, and a positioning signal from the captured satellite in which the pseudo distance residual exceeds a predetermined threshold is not used for a positioning calculation processing. The pseudo distance residual means a difference between a distance (coordinate derived value) determined based on coordinates of an estimated current position of the positioning device and position coordinates of the positioning satellite, and a pseudo distance as an observation value calculated from a reception result of the positioning signal.

In the positioning device in which the pseudo distance residuals are sequentially calculated for each captured satellite and the positioning calculation processing is performed by using only observation data of captured satellites whose pseudo distance residuals are equal to or lower than a predetermined level at a previous time, a threshold for the pseudo distance residuals acts as a reference when selecting the captured satellites used in the positioning calculation processing.

In general, in a multipath environment such as an urban area, the quality of positioning signals from individual captured satellite is deteriorated as compared with an open sky environment, and therefore, as the number of positioning satellites used in the positioning calculation processing increases more, an improvement in positioning accuracy can be expected more. In view of such circumstances, in the multipath environment such as the urban area, it is preferable that the threshold for the pseudo distance residual is larger. This is because, in the positioning device described above, if the threshold for the pseudo distance residual for selecting the captured satellites used in the positioning calculation processing is too small, the number of captured satellites that can be used in the positioning calculation processing decreases, thereby making it difficult to obtain an effect of improving the positioning accuracy.

On the other hand, in the open sky environment, since the quality of positioning signals from the individual captured satellites is better than that in the multipath environment, even if the number of captured satellites used in the positioning calculation processing is relatively small, high precision positioning can be sufficiently performed. Further, when the threshold for the pseudo distance residual is set to a small value, the possibility that observation data having a large error such as the pseudo distance is mixed with observation data used in the positioning calculation processing can be restricted, and a further improvement in positioning accuracy can be expected. In other words, in the open sky environment, it is preferable that the threshold for the pseudo distance residual is small.

As described above, the condition for selecting the captured satellites (in other words, the observation data) used in the positioning calculation processing, which should be set to obtain a positioning result with higher accuracy, changes depending on the surrounding environment.

According to one aspect of the present disclosure, a positioning device includes a signal receiver, an environment index value calculator, a dispersion calculator, a primary selector, an environment determiner, a condition changer, and a position calculator. The signal receiver is configured to receive a plurality of positioning signals respectively transmitted from a plurality of positioning satellites. The environment index value calculator is configured to sequentially calculate, as an index value for determining whether in a multipath environment, at least one of a Doppler shift amount and a pseudo distance of each of the positioning satellites based on each of the positioning signals received by the signal receiver. The dispersion calculator is configured to calculate an index value dispersion indicating a degree of variation of the index value calculated by the environment index value calculator for each of captured satellites which are the positioning satellites from which the positioning signals are received by the signal receiver. The primary selector is configured to determine a non-use satellite not to be used in a positioning calculation processing among the captured satellites based on the index value dispersion calculated by the dispersion calculator for each of the captured satellites. The environment determiner is configured to determine whether a surrounding environment is an environment in which a multipath is likely to occur based on a deletion rate which is a ratio of the number of the captured satellite set as the non-use satellite by the primary selector to a total number of the captured satellites. The condition changer is configured to change a condition of the captured satellites to be used in the positioning calculation processing based on a determination result of the environment determiner. The positioning calculator is configured to perform the positioning calculation processing using the positioning signals from the positioning satellites that satisfy the condition set by the condition changer.

According to another aspect of the present disclosure, a positioning device includes a processor and a memory. The memory stores instructions configured to, when executed by the processor, cause the processor to receive a plurality of positioning signals respectively transmitted from a plurality of positioning satellites, sequentially calculate, as an index value for determining whether in a multipath environment, at least one of a Doppler shift amount and a pseudo distance of each of the positioning satellites based on each of the positioning signals that are received, calculate an index value dispersion indicating a degree of variation of the index value calculated for each of captured satellites which are the positioning satellites from which the positioning signals are received, determine a non-use satellite not to be used in a positioning calculation processing among the captured satellites based on the index value dispersion calculated for each of the captured satellites, determine whether a surrounding environment is an environment in which a multipath is likely to occur based on a deletion rate which is a ratio of the number of the captured satellite set as the non-use satellite to a total number of the captured satellites, change a condition of the captured satellites to be used in the positioning calculation processing based on a determination result of the surrounding environment, and perform the positioning calculation processing using the positioning signals from the positioning satellites that satisfy the condition.

According to another aspect of the present disclosure, a positioning method includes receiving a plurality of positioning signals respectively transmitted from a plurality of positioning satellites, sequentially calculating, as an index value for determining whether in a multipath environment, at least one of a Doppler shift amount and a pseudo distance of each of the positioning satellites based on each of the positioning signals that are received, calculating an index value dispersion indicating a degree of variation of the index value calculated for each of captured satellites which are the positioning satellites from which the positioning signals are received, determining a non-use satellite not to be used in a positioning calculation processing among the captured satellites based on the index value dispersion calculated for each of the captured satellites, determining whether a surrounding environment is an environment in which a multipath is likely to occur based on a deletion rate which is a ratio of the number of the captured satellite set as the non-use satellite to a total number of the captured satellites, changing a condition of the captured satellites to be used in the positioning calculation processing based on a determination result of the surrounding environment, and performing the positioning calculation processing using the positioning signals from the positioning satellites that satisfy the condition.

According to the above-described aspects, the condition of the captured satellites to be used in the positioning calculation processing (hereinafter referred to as an adoption condition) is dynamically changed in accordance with the determination result of the environment determiner. Therefore, for example, when it is determined that the surrounding environment is an environment in which the multipath is less likely to occur, the adoption condition is changed to a relatively strict condition, thereby being capable of narrowing down the captured satellites to be used in the positioning calculation processing to a captured satellite with a high signal quality and improving the positioning accuracy. In addition, when it is determined that the surrounding environment is an environment in which the multipath is likely to occur, the number of captured satellites to be used in the positioning calculation processing can be increased by relaxing the adoption condition, and the positioning accuracy can be improved.

In other words, according to the above-described aspects, since the adoption condition is dynamically changed in accordance with the surrounding environment, both the improvement in the positioning accuracy in the open sky environment and the improvement in the positioning accuracy in the multipath environment can be performed.

Embodiment

A positioning device 1 according to an embodiment of the present disclosure will be described with reference to the drawings. FIG. 1 is a diagram showing a schematic configuration of a satellite positioning system 100 including a positioning device (POSI APPA) 1 according to the present embodiment. The positioning device 1 successively measures a current position by receiving positioning signals transmitted from each of multiple positioning satellites 2 and a quasi-zenith satellite 3. The positioning device 1 is mounted on a vehicle Hv, and the positioning result (that is, current position information) of the positioning device 1 is used by various application software such as self-driving and route guidance.

The subject vehicle Hv may be a four-wheeled vehicle, a two-wheeled vehicle, a three-wheeled vehicle, or the like. The two-wheeled vehicle also includes a motorized bicycle. The subject vehicle Hv may be, for example, a construction vehicle, an agricultural work vehicle, or the like, which has a main purpose other than the movement of an occupant. The positioning device 1 may be mounted on a vehicle other than the vehicle. For example, the positioning device 1 may be mounted on a communication terminal (hereinafter referred to as a mobile terminal) carried by a user, such as a smartphone, a tablet terminal, a wearable terminal, or the like.

The positioning device 1 can be used in any area in the world. As an example, a case in which the positioning device 1 is used in Japan will be assumed. Details of the configuration, functions, and the like of the positioning device 1 will be described later.

The positioning satellites 2 are artificial satellites configuring a predetermined global positioning satellite system (hereinafter referred to as GNSS). Examples of GNSS include GPS, Galileo, GLONASS, and BeiDou. In the present embodiment, the following configuration will be described on the assumption that the positioning satellites 2 are artificial satellites configuring GPS (Global Positioning System), which is one GNSS, but the present disclosure is not limited to the following configuration. The positioning satellites 2 may be artificial satellites configuring GLONASS or artificial satellites configuring BeiDou.

The satellite positioning system 100 may be a system in which multiple types of GNSS are combined with each other. In other words, the positioning device 1 may be configured to correspond to each of the multiple GNSSs such as GPS, Galileo, GLONASS, and BeiDou, and to be capable of performing a positioning calculation processing with the use of multiple GNSS positioning signals in combination. For example, the positioning device 1 may perform the positioning calculation processing with the use of both the positioning signals transmitted from the positioning satellites 2 configuring the GPS and the positioning signals transmitted from the positioning satellites 2 configuring GLONASS.

Although only four positioning satellites 2 are shown in FIG. 1, a larger number of positioning satellites 2 may actually exist. For example, there are 30 or more positioning satellites 2 configuring the GPS. There are 20 or more positioning satellites 2 configuring GLONASS.

Each of the positioning satellites 2 sequentially (for example, every 50 milliseconds) transmits a signal (hereinafter referred to as a positioning signal) obtained by phase-modulating data indicating a transmission time or the like by using a C/A code unique to each of the positioning satellites. In addition to the transmission time, the positioning signal indicates, for example, data indicating an error of a satellite clock, ephemeris data indicating a current position of the satellite itself, almanac data indicating general orbit information of all the positioning satellites, and the like. The various data are transmitted sequentially. Since the C/A code is unique to each positioning satellite 2, the C/A code functions as information indicating a transmission source. For convenience, the positioning satellite 2 from which the positioning signal is received by the positioning device 1 is also referred to as a captured satellite.

The quasi-zenith satellite 3 is an artificial satellite orbiting an orbit (a so-called quasi-zenith orbit) that stays above a specified area for a long time, including an area where the positioning device 1 is used (that is, Japan), and configures a quasi-zenith satellite system (hereinafter referred to as QZSS). QZSS corresponds to an example of a regional navigation satellite system (so-called RNSS). The quasi-zenith satellite 3 is an optional element.

The quasi-zenith satellite 3 is configured so as to be able to operate integrally with GPS, and sequentially transmits positioning signals similar to the positioning signals transmitted by the positioning satellites 2 as the GPS satellites. As described above, the quasi-zenith satellite 3 provides the same function as that of the positioning satellite 2, so that the positioning satellites 2 to be described later include the quasi-zenith satellite 3. The positioning satellites of the present disclosure include the quasi-zenith satellite 3 in addition to the positioning satellites 2 as the GPS satellites.

In addition to the positioning signal, the quasi-zenith satellite 3 transmits a correction signal indicating correction information for a predetermined positioning satellite 2 through a satellite line. In the present specification, the correction information is, for example, information indicating precision satellite coordinates, a clock error, a phase bias, an ionospheric correction amount, a tropospheric correction amount, and the like of the positioning satellite 2 as an object. The ionospheric correction amount is a parameter for correcting an influence of a delay in the ionospheric layer, such as an error of a pseudo distance or a carrier phase, which occurs according to a thickness of the ionospheric layer, for example. The tropospheric correction amount is a parameter for correcting an influence of a delay in a troposphere (for example, an error in the pseudo distance or a carrier phase). The correction signal transmitted by the quasi-zenith satellite 3 may be generated based on data generated and transmitted by a center installed on the ground (hereinafter referred to as a ground station). The correction signal may be a signal similar to an SBAS reinforcement message.

Figure 2:
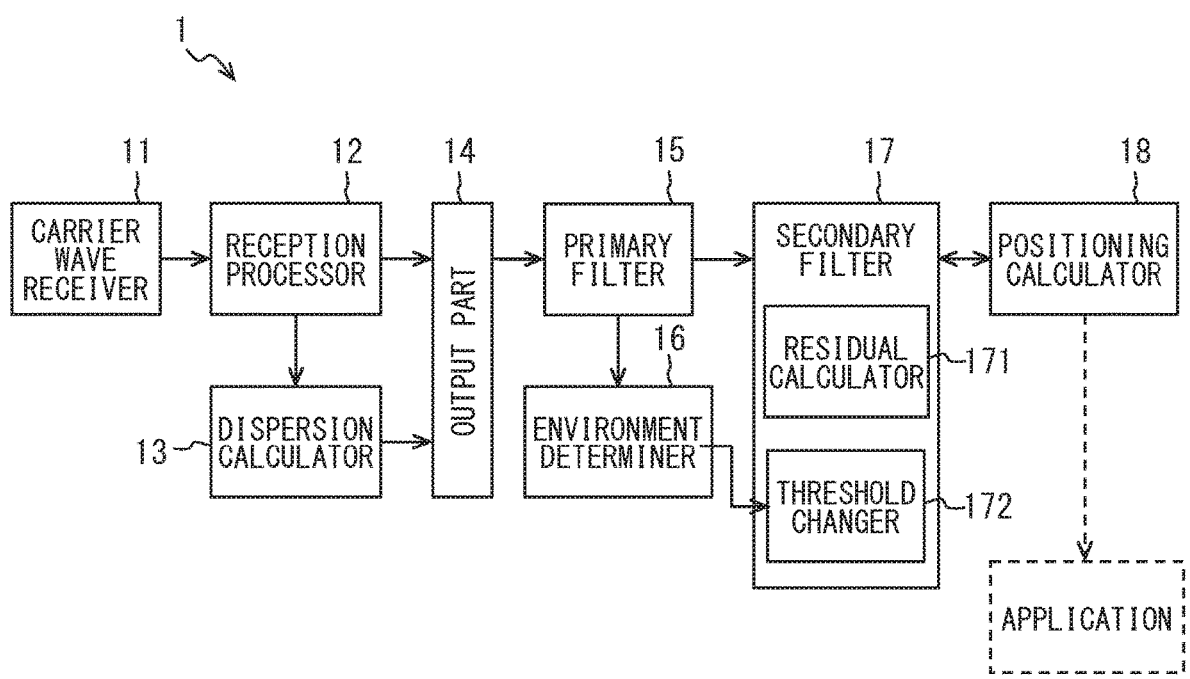
FIG. 2 is a block diagram showing an example of a schematic configuration of a positioning device.

Next, the configuration and function of the positioning device 1 will be described with reference to FIG. 2. As shown in FIG. 2, the positioning device 1 includes a carrier wave receiver 11, a reception processor 12, a dispersion calculator 13, an output part 14, a primary filter 15, an environment determiner 16, a secondary filter 17, and a positioning calculator 18. The reception processor 12, the dispersion calculator 13, the output part 14, the primary filter 15, the environment determiner 16, the secondary filter 17, and the positioning calculator 18 can be realized by a CPU (not shown) executing a predetermined program (hereinafter referred to as a positioning program). In that case, the positioning device 1 includes a CPU that executes various calculation processing, a flash memory that is a nonvolatile memory, a RAM that is a volatile memory, an I/O, a bus line that connects these components to each other, and the like.

A program for causing a normal computer to function as the positioning device 1 (that is, a positioning program) may be stored in a non-transitory tangible recording medium. For example, the positioning program may be stored in a ROM, a flash memory, or the like. Execution of the positioning program by the CPU corresponds to execution of a method corresponding to the positioning program.

In the present embodiment, as an example, the positioning device 1 includes the reception processor 12, the dispersion calculator 13, the output part 14, the primary filter 15, the environment determiner 16, the secondary filter 17, and the positioning calculator 18 as functional blocks expressed by the CPU executing the positioning program, but the present disclosure is not limited to the above configuration. Part or all of the functional blocks described above may be implemented as hardware. A mode realized as the hardware includes a mode realized by using one or multiple ICs or the like. Further, part or all of the functional blocks described above may be realized by cooperation of the software executed by the CPU and hardware members.

The carrier wave receiver 11 is a communication module that receives a radio wave as the positioning signal transmitted from the positioning satellite 2, converts the radio wave into an electric signal, and outputs the electric signal. The carrier wave receiver 11 includes an antenna for receiving the positioning signal (hereinafter referred to as a GNSS antenna). In addition to at least one GNSS antenna, the carrier wave receiver 11 includes a frequency conversion circuit for converting a received signal into a baseband signal, an analog-to-digital converter for converting an analog signal output from the GNSS antenna into a digital signal, and the like. The carrier wave receiver 11 may include an amplifier circuit or the like. The carrier wave receiver 11 corresponds to a signal receiver.

When the positioning device 1 is configured to be capable of performing the positioning calculation processing with the use of the GNSS positioning signals, the carrier wave receiver 11 may include multiple GNSS antennas corresponding to the carrier frequencies of the respective GNSSs. The carrier wave receiver 11 may be configured to be able to receive the positioning signals of the respective positioning systems to which the positioning device 1 is supposed to correspond.

The reception processor 12 is configured to generate observation data for a transmission source positioning satellite based on the positioning signal output from the carrier wave receiver 11. The observation data is data about the captured satellite determined according to the received positioning signal. In the present specification, as an example, it is assumed that the reception processor 12 generates and outputs data indicating a satellite number, an observation time, a Doppler shift amount, a pseudo distance, satellite coordinates, a carrier phase, and the like as the observation data. The satellite number is information for distinguishing the multiple positioning satellites 2 from each other, and may be, for example, a PRN (Pseudo Random Noise) ID. The observation time may be a time at which the positioning signal for generating the observation data is received.

The Doppler shift amount is a parameter representing a difference between the carrier wave frequency and the reception frequency caused by the Doppler effect. The pseudo distance is a distance determined according a time from when the positioning signal is transmitted from the positioning satellite 2 to when the positioning signal is received by the reception processor 12 (hereinafter referred to as a signal propagation time), and a propagation speed of the radio wave. The signal propagation time may be calculated according to a difference between a transmission time and a reception time, or may be calculated based on a deviation amount of the phase of a C/A code. The satellite coordinates are information indicating the current position of the positioning satellite in a satellite orbit.

It should be noted that the observation data does not need to include all of the information described above, and specific items to be included in the observation data may be appropriately designed. The observation data may include almanac data, ephemeris data used to calculate the satellite coordinates, and the like. The observation data may include information necessary for the positioning calculation processing. The reception processor 12 includes a pseudo distance calculator for calculating the pseudo distance, a Doppler shift amount calculator, and the like as sub-functions for generating the observation data described above. The pseudo distance calculator and the Doppler shift amount calculator are not illustrated. As described above, the reception processor 12 having the functions of the pseudo distance calculator and the Doppler shift amount calculator corresponds to an environment index value calculator. The environment index value calculator calculates, as an index value, at least one of the Doppler shift amount and the pseudo distance, that is, only the Doppler shift amount, or only the pseudo distance, or both of the Doppler shift amount and the pseudo distance.

The reception processor 12 generates the observation data described above each time the carrier wave receiver 11 receives the positioning signal. As a result, observation data is sequentially generated for each positioning satellite from which the positioning signal is being received (that is, captured satellite). The observation data for each captured satellite generated by the reception processor 12 is output to the output part 14. The pseudo distance generated by the reception processor 12 is correlated with information (for example, satellite number) indicating which of the captured satellites the pseudo distance belong to, and output to the dispersion calculator 13.

The dispersion calculator 13 acquires the pseudo distances for the respective captured satellites sequentially provided from the reception processor 12, distinguishes the pseudo distances for the respective captured satellites, and stores the pseudo distances in a memory (not shown). The memory may be realized by using a rewritable storage medium such as a RAM. The multiple pseudo distances having different acquisition times for the same captured satellite may be sorted in chronological order and stored in the memory so that the latest data becomes the head, for example. In addition, the data that has been stored for a certain period of time may be discarded in order.

The dispersion calculator 13 calculates a pseudo distance dispersion indicating the degree of variation of the pseudo distance calculated (in other words, observed) within the most recent predetermined time period for each captured satellite. The pseudo distance dispersion for a certain captured satellite may be a standard deviation whose population is a pseudo distance calculated within a predetermined time (for example, 5 seconds) in the past from the current point in time. As another mode, other indices indicating the degree of variation of data in statistics, such as dispersion, a difference between a maximum value and a minimum value, can be adopted as the degree of dispersion.

The pseudo distance dispersion for a certain captured satellite may be calculated when a new pseudo distance for the captured satellite is acquired. In addition, the dispersion calculator 13 may be configured to sequentially calculate the pseudo distance dispersion for each captured satellite in a predetermined cycle (for example, every 100 milliseconds).

As another mode, the dispersion calculator 13 may be configured to calculate a shift amount dispersion indicating the degree of variation in the Doppler shift amount calculated and observed within the most recent predetermined time instead of the pseudo distance dispersion. In that case, the reception processor 12 may be configured to output the Doppler shift amount to the dispersion calculator 13 instead of the pseudo distance.

As another mode, the dispersion calculator 13 may be configured to calculate both the pseudo distance dispersion and the shift amount dispersion for each captured satellite. In that case, the reception processor 12 may be configured to sequentially output both the pseudo distance and the Doppler shift amount to the dispersion calculator 13.

In the case where a surrounding environment of the vehicle Hv is in a multipath environment, since the variation of the pseudo distance calculated sequentially becomes large, the pseudo distances function as an index value as to whether the surrounding environment is in a multipath environment. When the surrounding environment of the subject vehicle Hv is in a multipath environment, an arrival direction of the positioning signal may be sequentially changed. If the arrival direction is changed, the Doppler shift amount is also changed. In other words, when the surrounding environment of the subject vehicle Hv is in the multipath environment, the variation of the Doppler shift amount calculated sequentially becomes large, and thus the Doppler shift amount calculated sequentially also functions as an index value as to whether the surrounding environment is in the multipath environment. In other words, the pseudo distance and the Doppler shift amount correspond to an index value. The pseudo distance dispersion and the shift amount dispersion correspond to an index value dispersion.

The pseudo distance dispersion calculated by the dispersion calculator 13 is output to the output part 14 in association with information (for example, satellite number) indicating which captured satellite the pseudo distance dispersion is for. The output part 14 outputs the observation data for each captured satellite input from the reception processor 12 and the pseudo distance dispersion for each captured satellite input from the dispersion calculator 13 to the primary filter 15.

The primary filter 15 deletes, from the observation data for each captured satellite, the observation data of the captured satellite whose pseudo distance dispersion is equal to or greater than a predetermined threshold (hereinafter referred to as a dispersion threshold). Then, the primary filter 15 outputs the observation data remaining after deleting the observation data of the captured satellite whose pseudo distance dispersion is equal to or greater than the dispersion threshold to the secondary filter 17. In other words, the primary filter 15 is configured to filter the observation data for each captured satellite so that only the observation data for the captured satellite having a relatively small pseudo distance dispersion is used in the secondary filter 17, which is a subsequent stage configuration.

For the sake of convenience, a process of deleting the observation data of the captured satellite in which the pseudo distance dispersion is equal to or greater than the dispersion threshold from the observation data for each captured satellite is referred to as a primary filtering process. The primary filter 15 corresponds to a primary selector. The captured satellites corresponding to the observation data remaining as a result of the primary filtering process are also referred to as primary remaining satellites.

It is to be noted that not outputting (that is, deleting) the observation data for a certain captured satellite to a subsequent stage processing corresponds to not using the captured satellite in the positioning calculation processing. In other words, the primary filter 15 corresponds to a configuration for determining a non-use satellite, which is a captured satellite that is not used in the positioning calculation processing, from among the multiple captured satellites based on the pseudo distance dispersion for each captured satellite. In other words, the primary filter 15 corresponds to a configuration in which the captured satellites to be used in the positioning calculation processing are selected from among multiple captured satellites based on the pseudo distance dispersion for each captured satellite.

In addition, the primary filter 15 calculates a deletion rate R representing a ratio of the number of deleted observation data to the number of observation data input from the output part 14 (in other words, the total number of captured satellites). When the number of observation data input from the output part 14 is N and the number of deleted observation data is k, the deletion rate R is represented by k/N. When the number of observation data input from the output part 14 is N and the number of deleted observation data is k, the number M of observation data output to the secondary filter 17 is N−k. The primary filter 15 outputs data indicating the deletion rate R to the environment determiner 16.

The environment determiner 16 is configured to determine, based on the deletion rate R provided from the primary filter 15, whether the surrounding environment of the positioning device 1 is an environment in which there are many features that block and scatter the signals from the positioning satellites in a skyward field of view (in other words, an environment in which a multipath is likely to occur). Whether the multipath is likely to occur is determined according to a quality of a skyward view of the positioning device 1.

According to the present embodiment, as an example, the surrounding environment is classified into four categories in stages according to the quality of the skyward view, and the environment determiner 16 determines which of the categories the current surrounding environment corresponds to in accordance with the deletion rate R. Hereinafter, the four categories are referred to as a first category C1, a second category C2, a third category C3, and a fourth category C4 in the descending order of the quality of the skyward view. The first category C1 corresponds to an environment in which the quality of the skyward view is the best, and the fourth category C4 corresponds to an environment in which the quality of skyward view is the worst.

When the quality of the skyward view is poor, the number of shields such as buildings and the like are greater, which means that the environment is likely to generate multipath. Further, when the multipath is more likely to occur, the pseudo distance dispersion becomes a relatively large value, as a result of which, the deletion rate R also becomes a relatively large value. Therefore, the environment determiner 16 determines that the surrounding environment corresponds to a category having a larger category number when the deletion rate R is larger.

Specifically, when the deletion rate R is less than a predetermined first deletion rate Rth1, the environment determiner 16 determines that the surrounding environment corresponds to the first category C1. A specific value of the first deletion rate Rth1 may be appropriately set by conducting a test. In this example, 10% is used as an example, but 5% or 15% or the like may be used. When the deletion rate R is equal to or greater than the first deletion rate Rth1 and less than a predetermined second deletion rate Rth2, it is determined that the surrounding environment corresponds to the category C2. A specific value of the second deletion rate Rth2 may be set as appropriate by executing a test in a range larger than the first deletion rate Rth1, and in this example, the value is set to 30%.

When the deletion rate R is equal to or greater than the second deletion rate Rth2 and less than a predetermined third deletion rate Rth3, the environment determiner 16 determines that the surrounding environment corresponds to the third category C3. A specific value of the third deletion rate Rth3 may be set as appropriate by executing a test larger than the second deletion rate Rth2, and in this example, the value is set to 60%. When the deletion rate R is equal to or higher than the third deletion rate Rth3, it is determined that the surrounding environment corresponds to the fourth category C4.

Figure 3:
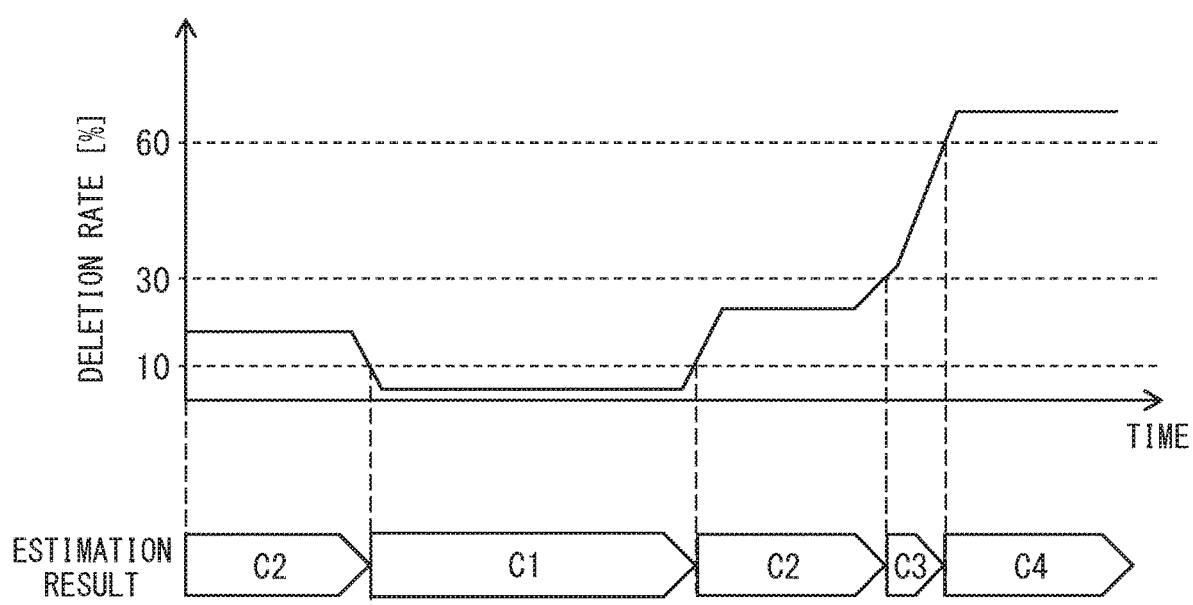
FIG. 3 is a diagram illustrating an operation of an environment determiner.

Each time the deletion rate R is input from the primary filter 15, the environment determiner 16 performs determination of the surrounding environment. Naturally, as the subject vehicle Hv travels, the surrounding environment transitions and the deletion rate R changes. In other words, as shown in FIG. 3, the determination result of the environment determiner 16 also changes over time with the transition of the deletion rate R. The determination result of the environment determiner 16 is sequentially output to the secondary filter 17.

The environment indicated by each category is specifically as follows. The first category C1 is a category corresponding to a so-called open sky environment. Quantitatively, the open sky environment may be, for example, an environment in which the sky exposure ratio (in other words, the sky factor) when the sky is photographed by a fisheye camera is 80% or more. It is needless to say that an environment in which the sky exposure ratio is 75% or 85% or more may be defined as the open sky environment. When the positioning device 1 is present in the open sky environment, it is expected that the pseudo distance dispersion will be a relatively small value because the multipath is less likely to occur, as a result of which, the deletion rate R can also be expected to be a relatively small value. The first deletion rate Rth1 described above may be determined based on the test result of the deletion rate R in the open sky environment. In the open sky environment, there is a high possibility that the positioning signals from the respective positioning satellites can be directly received without being reflected by buildings or the like. For that reason, the open sky environment is an environment in which the positioning results with relatively high accuracy can be obtained. The first category C1 corresponds to the open sky category.

The second category C2 is a category indicating an area in which the number of structures such as buildings is relatively small among the urban areas (in other words, a multipath is less likely to occur). For example, the second category C2 may correspond to an environment in which the sky exposure ratio becomes a relatively low value (for example, 65% or more and less than 80%).

The third category C3 is a category indicating an area in which there are relatively many structures such as buildings among the urban areas (in other words, a multipath tends to occur). A criterion for dividing the second category C2 and the third category C3 may be appropriately determined based on the test result. For example, the third category C3 may correspond to an environment in which the sky exposure ratio becomes a relatively low value (for example, 50% or more and less than 65%). The fourth category C4 is a category indicating an urban area where a high-rise building or the like exists. For example, the fourth category C4 may be a category assuming an environment in which the sky exposure ratio is less than 50%. The fourth category C4 corresponds to an urban category.

In the present embodiment, the surrounding environment is classified into the four stages of categories C1 to C4 according to the quality of skyward view, but the present disclosure is not limited to such a classification. The surrounding environment may be classified into two stages, three stages, or five stages. For example, the surrounding environment may be classified into two stages as to whether the environment is the open sky environment. In addition, the second category C2 and the third category C3 of the present embodiment are integrated into one category, so that the surrounding environment may be divided into three categories as a whole. Environments such as in forests, tunnel interiors, or the like may be added as categories.

The secondary filter 17 is configured to delete observation data relatively strongly affected by the multipath or the like from observation data for each primary remaining satellite provided from the primary filter 15, and output the remaining observation data to the positioning calculator 18. In other words, the secondary filter 17 corresponds to a configuration for extracting observation data finally used in positioning calculation processing from observation data for each primary remaining satellite. The secondary filter 17 includes a residual calculator 171 and a threshold changer 172 as sub-functions.

The secondary filter 17 including the residual calculator 171 and the threshold changer 172 generally operates as follows. First, the secondary filter 17 calculates a pseudo distance residual $\Delta D$ for each of the primary remaining satellites extracted as a result of the primary filtering process by the primary filter 15. Only the observation data of the captured satellite whose pseudo distance residual $\Delta D$ is less than a predetermined residual threshold Dth is output to the positioning calculator 18. The residual calculator 171 described above is configured to calculate the pseudo distance residual $\Delta D$ for each of the primary remaining satellites.

The pseudo distance residual $\Delta D$ for a certain positioning satellite 2 is an absolute value of a difference between a straight line distance from the current position of the positioning device 1 to the positioning satellite 2, and a distance (that is, pseudo distance) calculated based on a time difference from the transmission of the positioning signal to the reception of the positioning signal by the positioning device 1, and a propagation speed of the radio wave (that is, the pseudo distance). The straight line distance from the current positioning device 1 to the positioning satellite 2 can be calculated according to the current position coordinates of the positioning device 1 and the position coordinates of the positioning satellite 2.

The pseudo distance residual $\Delta D$ calculated as described above tends to take a large value when the positioning signal is strongly influenced by multipath or the like and the pseudo distance includes an error. In other words, the pseudo distance residual $\Delta D$ for a certain captured satellite functions as a parameter indicating the magnitude of the possibility that the pseudo distance calculated based on the positioning signal transmitted from the captured satellite includes an error. Therefore, the pseudo distance residual $\Delta D$ corresponds to an error index value. The residual calculator 171 corresponds to an error index value calculator.

Strictly speaking, the position coordinates as the current position of the positioning device 1 used when calculating the pseudo distance residual $\Delta D$ may be the position coordinates calculated by the positioning calculator 18 at a previous time. Since the positioning calculator 18 basically performs the positioning calculation processing every about 50 to 100 milliseconds, the position coordinates calculated by the positioning calculator 18 at the previous time indicate the position of the positioning device 1 at 50 to 100 milliseconds before the current time. In calculating the pseudo distance residual $\Delta D$, it is assumed that an error between the position coordinates calculated by the positioning calculator 18 at the previous time and the actual current position is negligible. Needless to say, the pseudo distance residual $\Delta D$ may be calculated by estimating a stricter current position by performing well-known dead reckoning based on the position coordinates calculated by the positioning calculator 18 at the previous time.

For convenience, the process of deleting the observation data of the captured satellite in which the pseudo distance residual $\Delta D$ is equal to or greater than a predetermined residual threshold from the observation data for each primary remaining satellite is referred to as a secondary filtering process. The captured satellites corresponding to the observation data remaining as a result of the secondary filtering process are also referred to as secondary remaining satellites.

The residual threshold Dth used in the secondary filtering process functions as a threshold for the pseudo distance residual for selecting the captured satellites (in other words, observation data) used in the positioning calculation processing. Therefore, the residual threshold Dth corresponds to the filtering threshold. The threshold changer 172 included in the secondary filter 17 is configured to change a value of the residual threshold Dth based on the category of the surrounding environment determined by the environment determiner 16.

When the environment determiner 16 determines that the surrounding environment is an environment in which a multipath is less likely to occur (that is, a category having a small number), the threshold changer 172 sets the residual threshold Dth to a relatively small value. When the environment determiner 16 determines that the surrounding environment is an environment in which a multipath is likely to occur (that is, a category having a large number), the residual threshold Dth is set to a relatively large value. The values of multiple stages (in other words, candidate values) that can be set by the threshold changer 172 as the residual threshold Dth are set in advance. The candidate values of the multiple stages are associated with respective categories of the multiple stages. Details of the operation of the threshold changer 172 will be described later with reference to FIG. 4 and the like.

If the residual threshold Dth is set to a relatively large value, the primary remaining satellite is more likely to be selected as the positioning satellite used in the positioning calculation processing, and if the residual threshold Dth is set to a relatively small value, the primary remaining satellite is less likely to be selected as the positioning satellite used in the positioning calculation processing. In other words, the residual threshold Dth functions as a parameter that defines the condition of the captured satellites to be used in the positioning calculation processing.

In other words, the threshold changer 172 is configured to relaxing or tighten the condition of the captured satellite used in the positioning calculation processing based on the determination result of the environment determiner 16. Therefore, the threshold changer 172 corresponds to a condition changer. The secondary remaining satellite described above corresponds to the captured satellite satisfying the condition of the captured satellites to be used in the positioning calculation processing set by the threshold changer 172.

The positioning calculator 18 performs the positioning calculation processing with the use of the observation data provided from the secondary filter 17. In other words, the positioning calculation processing is performed with the use of the observation data of the secondary remaining satellites remaining as a result of the secondary filtering process by the secondary filter 17. As the method of the positioning calculation processing (hereinafter referred to as a positioning method), various well-known methods such as PPP-AR (more specifically, MADOCA-PPP) and PPP-RTK can be adopted. Since a specific procedure of each positioning method is well known, the details of the specific procedure will be omitted.

PPP is an abbreviation for Precise Point Positioning (that is, single carrier phase positioning), and AR is an abbreviation for Ambiguity Resolution. MADOCA is an abbreviation for Multi-GNSS Advanced Demonstration tool for Orbit and Clock Analysis. RTKs are abbreviations for Real-Time Kinematic.

The positioning calculator 18 outputs position information as a result of the positioning calculation processing to a predetermined application. The application using the position information may be incorporated in the positioning device 1, or may be incorporated in an electronic device provided outside the positioning device 1. The positioning calculator 18 also outputs the result of the positioning calculation processing to the secondary filter 17. The position information provided to the secondary filter 17 is used for the next calculation of the pseudo distance residual $\Delta D$.

Figure 4:
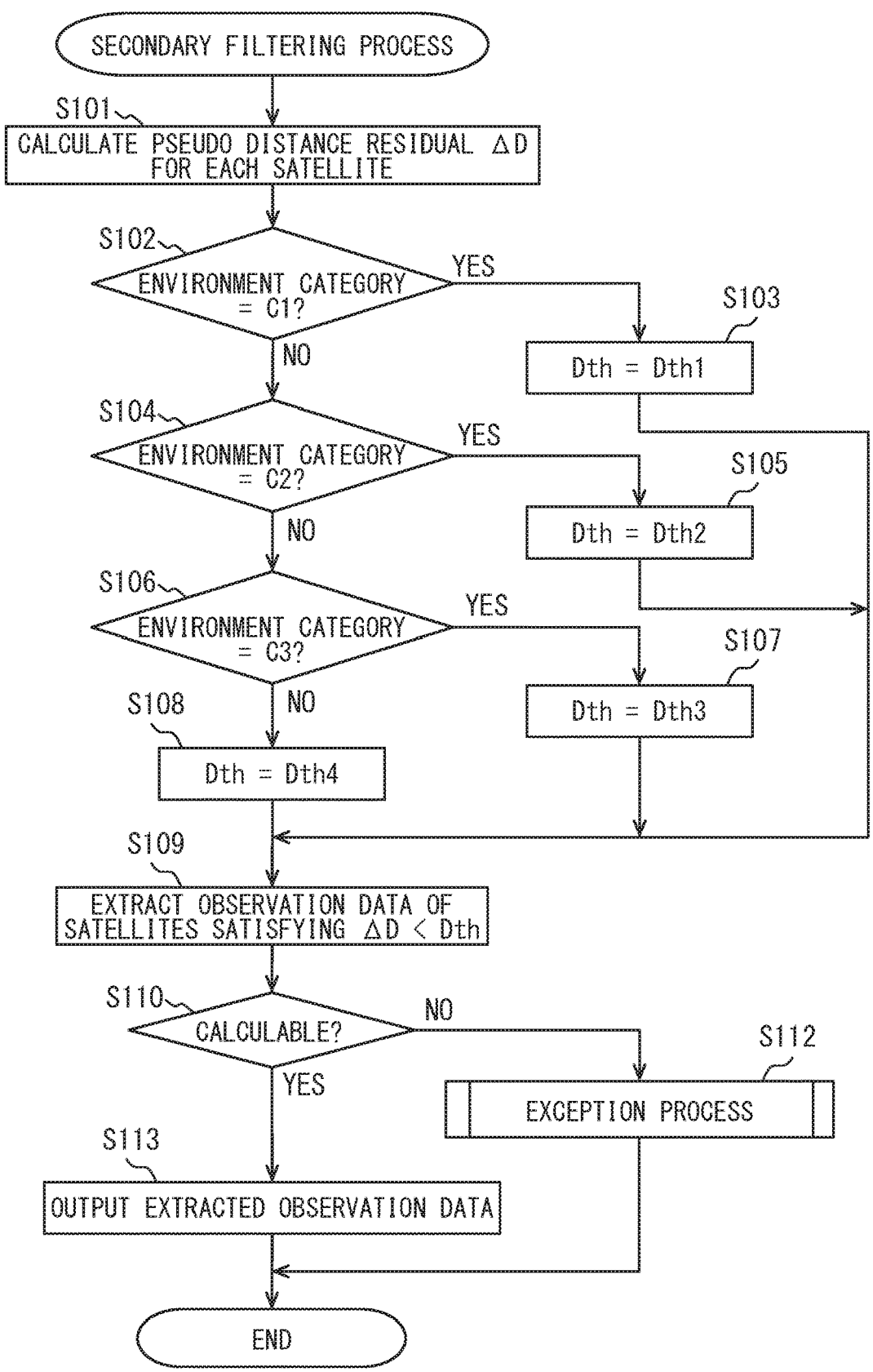
FIG. 4 is a flowchart illustrating a secondary filtering process performed by a secondary filter.

Next, the secondary filtering process performed by the secondary filter 17 will be described with reference to a flowchart shown in FIG. 4. The flowchart shown in FIG. 4 may be started every time observation data is input from the primary filter 15.

First, in S101, the residual calculator 171 calculates the pseudo distance residual $\Delta D$ for each primary remaining satellite based on the observation data for each primary remaining satellite (mainly the pseudo distances and the satellite coordinates) and the position information of the positioning device 1, and moves to S101.

In S102, the threshold changer 172 determines whether the determination result of the surrounding environment by the environment determiner 16 is the first category C1. When the result of the determination of the surrounding environment by the environment determiner 16 is the first category C1, an affirmative determination is made in S102, and S103 is executed. On the other hand, when the determination result of the surrounding environment by the environment determiner 16 is not the first category C1, a negative determination is made in S102, and S104 is executed.

In S103, the threshold changer 172 sets the residual threshold Dth to a predetermined first threshold Dth1 prepared in advance as a candidate value of the residual threshold Dth, and moves to S108. A specific value of the first threshold Dth1 may be determined based on the test result of the pseudo distance residual in the open sky environment. For example, the first threshold Dth1 may be set to a value of about 2 to 5 m. The first thresholds Dth1 correspond to the candidate values associated with the first category C1 as the open sky category.

In S104, it is determined whether the determination result of the surrounding environment by the environment determiner 16 is the second category C2. When the result of the determination of the surrounding environment by the environment determiner 16 is the second category C2, an affirmative determination is made in S104, and S105 is executed. On the other hand, when the result of the determination of the surrounding environment by the environment determiner 16 is not the second category C2, a negative determination is made in S104, and S106 is executed.

In S105, the threshold changer 172 sets the residual threshold Dth to a predetermined second threshold Dth2, and proceeds to S108. A specific value of the second threshold Dth2 may be appropriately set within a range larger than the first threshold Dth1. It is preferable that the second threshold Dth2 is set to a value of a level at which the number of secondary remaining satellites is increased by 1 to 2 or more as compared with a case in which the residual threshold Dth is set to the first threshold Dth1, and the positioning accuracy can be improved by increasing the number of positioning satellites used in the positioning calculation processing (hereinafter referred to as the number of used satellites). The specific value at which the above effect can be obtained may be determined based on the test result in the second category C2. The second thresholds Dth2 correspond to a candidate value associated with the second category C2.

In S106, it is determined whether the determination result of the surrounding environment by the environment determiner 16 is the third category C3. When the result of the determination of the surrounding environment by the environment determiner 16 is the third category C3, an affirmative determination is made in S106, and S107 is executed. On the other hand, when the result of the determination of the surrounding environment by the environment determiner 16 is not the third category C3, a negative determination is made in S106, and S108 is executed. The case where the determination result of the surrounding environment by the environment determiner 16 is not the third category C3 corresponds to a case in which the determination result of the surrounding environment by the environment determiner 16 is the fourth category C4.

In S107, the threshold changer 172 sets the residual threshold Dth to a predetermined third threshold Dth3, and proceeds to S108. A specific value of the third threshold Dth3 may be appropriately set within a range larger than the second threshold Dth2. It is preferable that the third threshold Dth3 is set to a value of a level at which the number of secondary remaining satellites increases by 1 to 2 or more compared with the case where the residual threshold Dth is set to the second threshold Dth2, and the positioning accuracy can be improved by increasing the number of used satellites. The specific value at which the above effect can be obtained may be determined based on the test result in the third category C3. The third threshold Dth3 corresponds to a candidate value associated with the third category C3.

In S108, the threshold changer 172 sets the residual threshold Dth to a predetermined fourth threshold Dth4, and moves to S108. A specific value of the fourth threshold Dth4 may be appropriately set within a range larger than the third threshold Dth3. It is preferable that the fourth threshold Dth4 is set to a value of a level at which the number of secondary remaining satellites increases by 1 to 2 or more compared with when the residual threshold Dth is set to the third threshold Dth3, and the positioning accuracy can be improved by increasing the number of used satellites. A specific value for obtaining the above effect may be determined based on the test result in the fourth category C4. Incidentally, only the fourth threshold Dth4 corresponding to the maximum value of the candidate value that can be set as the residual threshold may be set to a sufficiently large value corresponding to infinity so that all the primary remaining satellites can be used for the positioning calculation processing. The fourth threshold Dth4 corresponds to a candidate value associated with the fourth category C4 as the urban category.

In S109, the secondary filter 17 extracts the observation data of the captured satellites whose pseudo distance residual ΔD is less than the residual threshold Dth set in the above process from the observation data for the captured satellites input from the primary filter 15, and moves to S110.

In S110, the secondary filter 17 determines whether the positioning calculator 18 can execute the positioning calculation processing based on the observation data extracted in S109. For example, when the number of observation data extracted in S109 (in other words, the number of secondary remaining satellites) is 4 or more, the positioning calculator 18 determines that the positioning calculation can be performed. On the other hand, when the number of observation data extracted in S109 is less than 4, the positioning calculator 18 determines that the positioning calculation cannot be performed.

When the number of the observation data extracted in S109 is sufficiently large so that the positioning calculator 18 can perform the positioning calculation, an affirmative determination is made in S110, and S111 is executed. On the other hand, when the number of observation data extracted in S109 is so small that the positioning calculator 18 cannot perform the positioning calculation, a negative determination is made in S110, and S112 is executed. When an estimation that a height of the positioning device 1 is the same as a height at the previous time is used, the number of observation data used as a criterion for determining whether the positioning calculator 18 can perform the positioning calculation may be three.

In S111, the secondary filter 17 outputs the observation data extracted in S109 to the positioning calculation processing, and the process is completed. As the processing after S111, the positioning calculator 18 performs the positioning calculation processing with the use of the observation data for each of the captured satellites provided from the secondary filter 17, and specifies the current position. The position information as the positioning result is output to a predetermined application and the secondary filter 17.

Figure 5:
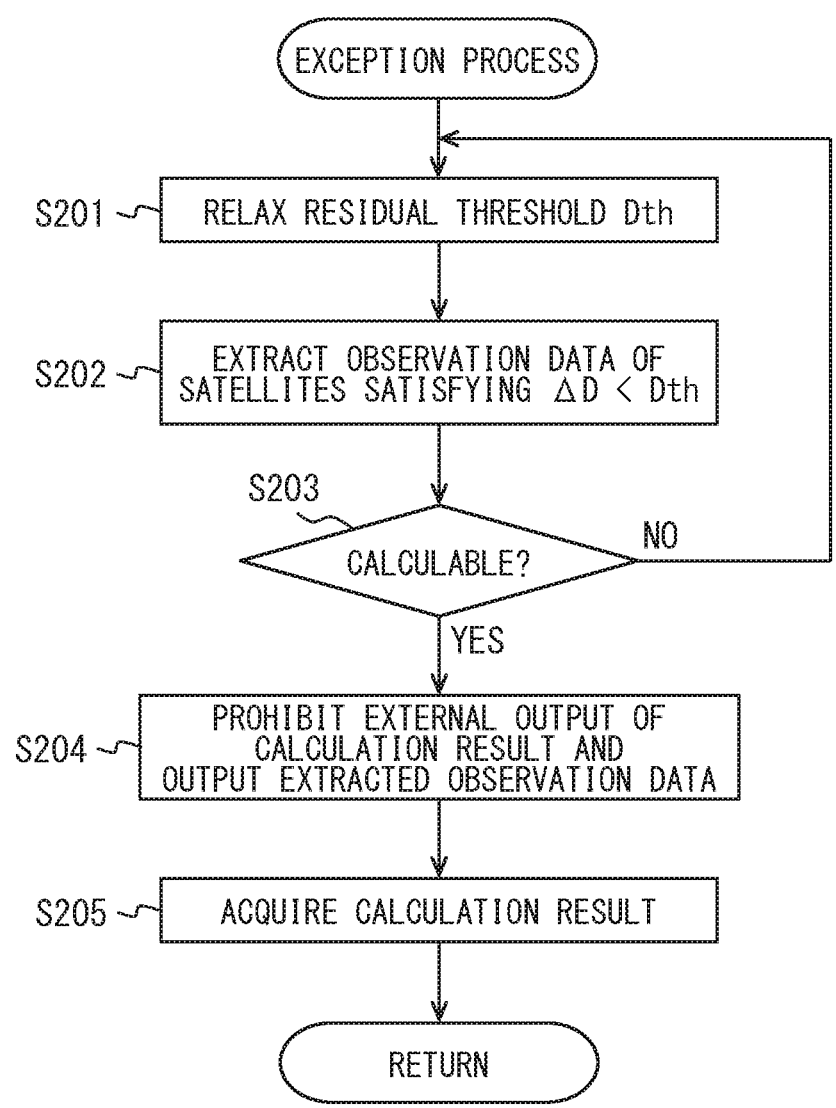
FIG. 5 is a flowchart illustrating an exception process performed by the secondary filter.

In S112, the secondary filter 17 performs a predetermined exception process. The exception process is performed when the positioning calculator 18 cannot execute the positioning calculation processing in the observation data extracted by the series of processing in the S101 to S109. The exception process will be described with reference to a flowchart shown in FIG. 5. The flowchart shown in FIG. 5 is executed when shifting to S112 of FIG. 4.

First, in S201, the threshold changer 172 sets the value of the residual threshold Dth to a value larger by one step than the present value, and moves to S202. Specifically, when the present residual threshold Dth is set to the first threshold Dth1, the residual threshold Dth is set to the second threshold Dth2. When the present residual threshold Dth is set to the second threshold Dth2, the residual threshold Dth is set to the third threshold Dth3. Similarly, when the present residual threshold Dth is set to the third threshold Dth3, the residual threshold Dth is set to the fourth threshold Dth4.

When the present residual threshold Dth is set to the fourth threshold Dth4, it is determined that the positioning calculation cannot be performed, and the process is completed. In that case, dead reckoning is performed with the positioning result at the time when the positioning calculation processing could be finally executed as a starting point, and a provisional current position is estimated.

In S202, observation data for the captured satellite whose pseudo distance residual ΔD is less than the residual threshold Dth newly set in S201 among the observation data for the captured satellites input from the primary filter 15 is extracted, and the process proceeds to S203.

In S203, it is determined whether the positioning calculator 18 can execute the positioning calculation processing based on the observation data extracted in S202. Since the actual process content of S203 is the same as that of the S110 described above, a description of the actual process content will be omitted. When the number of the observation data extracted in S202 is large enough to allow the positioning calculator 18 to perform the positioning calculation, an affirmative determination is made in S203, and S204 is executed. On the other hand, when the number of the observation data extracted in S202 is so small that the positioning calculator 18 cannot perform the positioning calculation, a negative determination is made in S203, and the process returns to S201.

In S204, after the result of the positioning calculation processing to the external application is prohibited from being output to the positioning calculator 18, the observation data extracted in S202 is output, and the process proceeds to S205. In response to S204, the positioning calculator 18 performs a positioning calculation processing with the use of the observation data provided from the secondary filter 17, and returns the result to the secondary filter 17. Further, based on an instruction from the secondary filter 17, the positioning result is not output to an external application. In other words, when the positioning calculation processing cannot be executed with the use of only the observation data satisfying the residual threshold Dth according to the determination result of the environment determiner 16, the positioning result is discarded externally.

In S205, the result of the positioning calculation processing in the positioning calculator 18 is acquired, and the flow is completed. The position information acquired in S205 is used to calculate the next pseudo distance residual.

A positioning device which does not have a configuration corresponding to the primary filter 15 is introduced as a first comparison configuration, and an effect of the present embodiment will be described. The positioning device according to the first comparison configuration uses a constant residual threshold for selecting a captured satellite to be use in positioning calculation processing regardless of the surrounding environment.

In general, in the open sky environment, since the quality of positioning signals from the individual captured satellites tends to be better than in a multipath environment such as an urban area, sufficient information can be obtained even if the number of observation data (in other words, captured satellites) to be used is limited. In other words, in the open sky environment, even if the number of captured satellites used in the positioning calculation processing is relatively small, high-precision positioning can be sufficiently performed. There may also be captured satellites that provide pseudo distances with relatively large errors due to circumstances such as a low elevation angle, even in the open sky environment.

For that reason, in the open sky environment, the positioning accuracy does not necessarily improve as the number of observation data increases. If the residual threshold is set to a relatively large value in the first comparison configuration, there is a possibility that observation data having a large error such as a pseudo distance will be mixed with observation data used in the positioning calculation processing, and thus the accuracy will deteriorate.

On the other hand, in the multipath environment, the quality of positioning signals from the individual captured satellites is deteriorated as compared with the open sky environment, and therefore, when the number of positioning satellites used in positioning calculation processing increases, an improvement in positioning accuracy can be expected. In other words, it is preferable that the residual threshold is large to some extent. This is because, if the residual threshold is set to a relatively small value in the first comparison configuration, the number of captured satellites used in the positioning calculation processing is reduced, and the effect of improving the accuracy by increasing the number of used satellites is less likely to be obtained.

Conditions (hereinafter referred to as adoption conditions) for selecting and selecting the captured satellites (in other words, observation data) to be used in the positioning calculation processing, which should be set to obtain positioning results with higher accuracy, differ depending on the surrounding environment. For that reason, in the first comparison configuration, it is difficult to achieve both the improvement of the positioning accuracy in the open sky environment and the improvement of the positioning accuracy in the multipath environment.

On the other hand, in the configuration of the present embodiment, when the environment determiner 16 determines that the surrounding environment is an environment in which the multipath is less likely to occur (that is, a category having a small number), the threshold changer 172 sets the residual threshold Dth to a relatively small value. As a result, only the observation data from the positioning satellite having a high signal quality is used for the positioning calculation processing. In the open sky environment, even if the number of captured satellites used for the positioning calculation processing is small, the high precision positioning can be performed. Therefore, the captured satellites used for the positioning calculation processing by the above processing is narrowed to the captured satellites with the high signal quality, thereby being capable of achieving even higher accuracy.

When the environment determiner 16 determines that the surrounding environment is an environment in which a multipath is likely to occur (that is, a category having a large number), the threshold changer 172 sets the residual threshold Dth to a relatively large value. As a result, the adoption condition is relaxed, and the number of captured satellites used in the positioning calculation processing can be increased. In the multipath environment, the larger the number of captured satellites used in the positioning calculation processing, the higher the accuracy of the positioning result tends to be, and therefore, the number of captured satellites used in the positioning calculation processing is increased by the processing described above, thereby being capable of further improving the accuracy.

In other words, according to the configuration of the present embodiment, the adoption condition is dynamically changed according to the surrounding environment, thereby being capable of achieving both the improvement of the positioning accuracy in the open sky environment and the improvement of the positioning accuracy in the multipath environment.

In addition, the positioning device 1 according to the present embodiment is expected to further improve the positioning accuracy by providing the primary filter 15. Specific examples will be described follows. In the multipath environment, the fluctuation of the pseudo distance is relatively large. Naturally, the pseudo distances of the captured satellites, which are strongly affected by the multipath largely fluctuate, and therefore the pseudo distance residuals also fluctuate dramatically. In other words, even if the pseudo distance residual of a certain captured satellite is small at a certain point in time, the pseudo distance residual is not necessarily small at the next point in time. Therefore, in the first comparison configuration, there remains a possibility that observation data having a large error such as a pseudo distance is mixed with the observation data used in the positioning calculation processing.

On the other hand, according to the configuration of the present embodiment, the primary filter 15 outputs only the observation data for the captured satellite having a relatively small pseudo distance dispersion, among the observation data for each captured satellite, to the secondary filter 17 having the configuration of the subsequent stage. Therefore, since the observation data of the captured satellite having a large variation in the pseudo distance is removed by the primary filtering process, the possibility that the observation data having a large error such as the pseudo distance is mixed with the observation data used in the positioning calculation processing can be restricted. As described above, according to the configuration of the present embodiment, a case where the pseudo distance residual instantaneously falls below the residual threshold Dth can be coped with, and further improvement of the positioning accuracy can be expected.

Further, in the above configuration, the category of the surrounding environment is determined based on the deletion rate R determined according to the reception state of the positioning signal. As another configuration for determining the category of the surrounding environment (hereinafter referred to as a second comparison configuration), a configuration using map data is also conceivable. However, in such a second comparison configuration, it is necessary for the positioning device to have a storage device in which map data is stored or a function of communicating with an external server to acquire map data, which increases the cost accordingly. On the other hand, since the environment determiner 16 of the present embodiment determines the category of the surrounding environment based on the deletion rate R determined according to the reception state of the positioning signal, it is not necessary for the positioning device 1 to have a function of communicating with a device storing map data or an external server. In other words, according to the present embodiment, the manufacturing cost can be reduced more than that of the second comparison configuration. The present disclosure can also be applied to a device that does not include a module for wide area communication.

In the case where 5 observation data are deleted when the number of captured satellites is 10 (hereinafter referred to as a first case) and the case where 5 observation data are deleted when the number of captured satellites is 30 (hereinafter referred to as a second case), even if the number of deleted observation data is the same, the degree of occurrence of multipath is different from each other. Naturally, this suggests that the first case is an environment in which the multipath is likely to occur (in other words, an environment in which there are many structures around). In view of such circumstances, if it is attempted to determine the surrounding environment by the number of deletions of observation data, there is a relatively high possibility that the surrounding environment is erroneously determined. On the other hand, as in the configuration of the present embodiment, the environment determiner 16 can reduce the possibility of erroneous determination of the surrounding environment by determining the category of the surrounding environment based on the deletion rate (that is, the deletion rate R) instead of the number of deleted observation data. In other words, with the use of the deletion rate R instead of the number of deletions of observation data as an index for discriminating the surrounding environment, the surrounding environment can be discriminated more accurately.

Although an example of the embodiment of the present disclosure has been described above, the present disclosure is not limited to the embodiment described above, and various modifications to be described below are also included in the technical scope of the present disclosure, and various modifications can be made without departing from the spirit of the present disclosure to be described below. Needless to say, various modifications can be implemented by appropriately combining the modifications together.

Note that members having the same functions as those described in the above embodiment are denoted by the same reference numerals, and descriptions of the same members will be omitted. When only a part of the configuration is referred to, the configuration of the embodiment described above can be applied to other parts.

(Modification 1)

In addition to the determination result of the environment determiner 16, the threshold changer 172 may determine the residual threshold Dth based on whether the quasi-zenith satellite 3 is being captured. For example, when the quasi-zenith satellite 3 is being captured, the residual threshold Dth may be set to a smaller value than when the quasi-zenith satellite 3 is not captured. Now, an example of a configuration based on the above concept will be described as Modification 1.

Figures 6, 7:
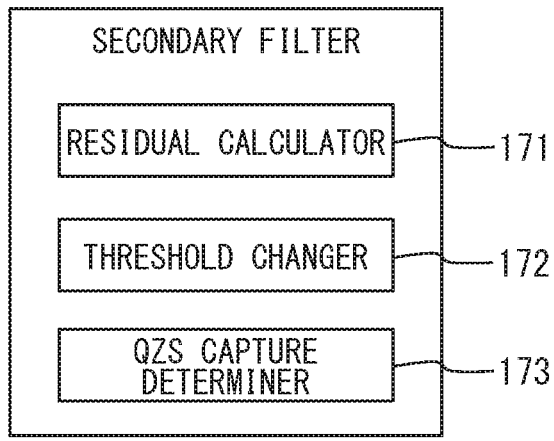
FIG. 6 is a block diagram showing an example of a schematic configuration of the secondary filter according to Modification 1.
FIG. 7 is a diagram showing an operation example of a threshold changer according to Modification 1.

As shown in FIG. 6, a secondary filter 17 in Modification 1 includes a QZS capture determiner 173 in addition to the residual calculator 171 and the threshold changer 172. The QZS capture determiner 173 is configured to determine whether the positioning signal from the quasi-zenith satellite 3 is being received or not (in other words, whether the positioning signal is being captured). Whether the quasi-zenith satellite 3 is being captured can be determined based on an elevation angle of the captured satellite and the transmission source information indicated by the positioning signal.

For example, the QZS capture determiner 173 may determine that the quasi-zenith satellite 3 is being captured when there is a captured satellite whose elevation angle is equal to or greater than a predetermined quasi-zenith angle. In this example, the quasi-zenith angle is an angle for separating the positioning satellite 2 (for example, GPS satellite) and the quasi-zenith satellite 3, which are orbiting the earth, from each other. The quasi-zenith angle may be set to a lower limit value (for example 70°) of an angle that can be regarded as a zenith direction. Incidentally, the elevation angle is an angle formed by a straight line connecting the captured satellite and the positioning equipment 1 with respect to the ground plane with the current position of the positioning device 1 as a reference. The elevation angle can be calculated based on the respective position coordinates of the positioning device 1 and the captured satellite.

The QZS capture determiner 173 may determine the QZS capture based on the transmission source information (for example, PRN-ID) indicated by the positioning signal. Further, when the correction signal transmitted by the quasi-zenith satellite 3 is being received, it may be determined that the quasi-zenith satellite 3 is being captured. The QZS capture determiner 173 corresponds to a quasi-zenith capture determiner.

When the QZS capture determiner 173 determines that the quasi-zenith satellite 3 is not being captured, the threshold changer 172 of Modification 1 sets the residual threshold Dth to a value associated with the category determined by the environment determiner 16. On the other hand, when the QZS capture determiner 173 determines that the quasi-zenith satellite 3 is being captured, the residual threshold Dth is set to a value smaller than the value associated with the category determined by the environment determiner 16. For example, as shown in FIG. 7, when it is determined by the QZS capture determiner 173 that the quasi-zenith satellite 3 is being captured, the residual threshold Dth may be set to a value obtained by multiplying the value applied when it is determined that the quasi-zenith satellite 3 is not being captured by 0.8.

The magnification in this example is not limited to 0.8, and may be 0.9, 0.7, or the like. Instead of reducing the residual threshold Dth by multiplying a coefficient of a predetermined magnification, the residual threshold Dth may be reduced by subtracting a predetermined value (for example, 0.5 m). Further, although FIG. 7 illustrates a mode in which the residual threshold Dth in the case where the quasi-zenith satellite 3 is being captured is set to a value smaller than the value in the case where the quasi-zenith satellite 3 is not being captured in all the categories, the present disclosure is not limited to the above mode. Only when the category determined by the environment determiner 16 corresponds to C1 to C2, the residual threshold Dth in the case where the quasi-zenith satellite 3 is being captured may be set to a value smaller than the value in the case where the quasi-zenith satellite 3 is not being captured.

When the quasi-zenith satellite 3 is being captured, the pseudo distance for each positioning signal is enhanced by an ionospheric correction amount and a tropospheric correction amount provided from the quasi-zenith satellite 3. Thus, the pseudo distance residuals themselves for each captured satellite may be generally small. As described above, since an average level of the pseudo distance residual is different depending on whether the quasi-zenith satellite 3 is being captured, if the same value is applied between the case where the quasi-zenith satellite 3 is being captured and the case where the quasi-zenith satellite 3 is not being captured, there is an increased possibility that observation data having a large error derived from the multipath is mixed into observation data used for the positioning calculation processing.

On the other hand, according to the configuration of the first modification, since the residual threshold Dth when the quasi-zenith satellite 3 is being captured is set to a value that is smaller than that in the case where the quasi-zenith satellite 3 is not being captured, the risk that the observation data, which has a relatively large error in the pseudo distance, may be mixed into the observed data used in the positioning calculation processing can be further reduced. As a result, further improvement in positioning accuracy can be expected.

In the above description, the QZS capture determiner 173 determines whether the positioning signal from the quasi-zenith satellite 3 is being received, but the present disclosure is not limited to such a configuration. The QZS capture determiner 173 may determine whether a reinforcement signal from the quasi-zenith satellite 3 is being received.

When the positioning device 1 is configured to be capable of acquiring local correction information such as an ionospheric correction amount and a tropospheric correction amount from a ground station through a wide area communication network or the like, the threshold changer 172 may execute the same processing as that of Modification 1 described above depending on whether the local correction information is being captured. In other words, in the case where the local correction information is being captured, the residual threshold Dth is set to a smaller value than that in the case where the local correction information is not being captured. Even with such a configuration, the same effects as in Modification 1 can be obtained.

(Modification 2)

Figure 8:
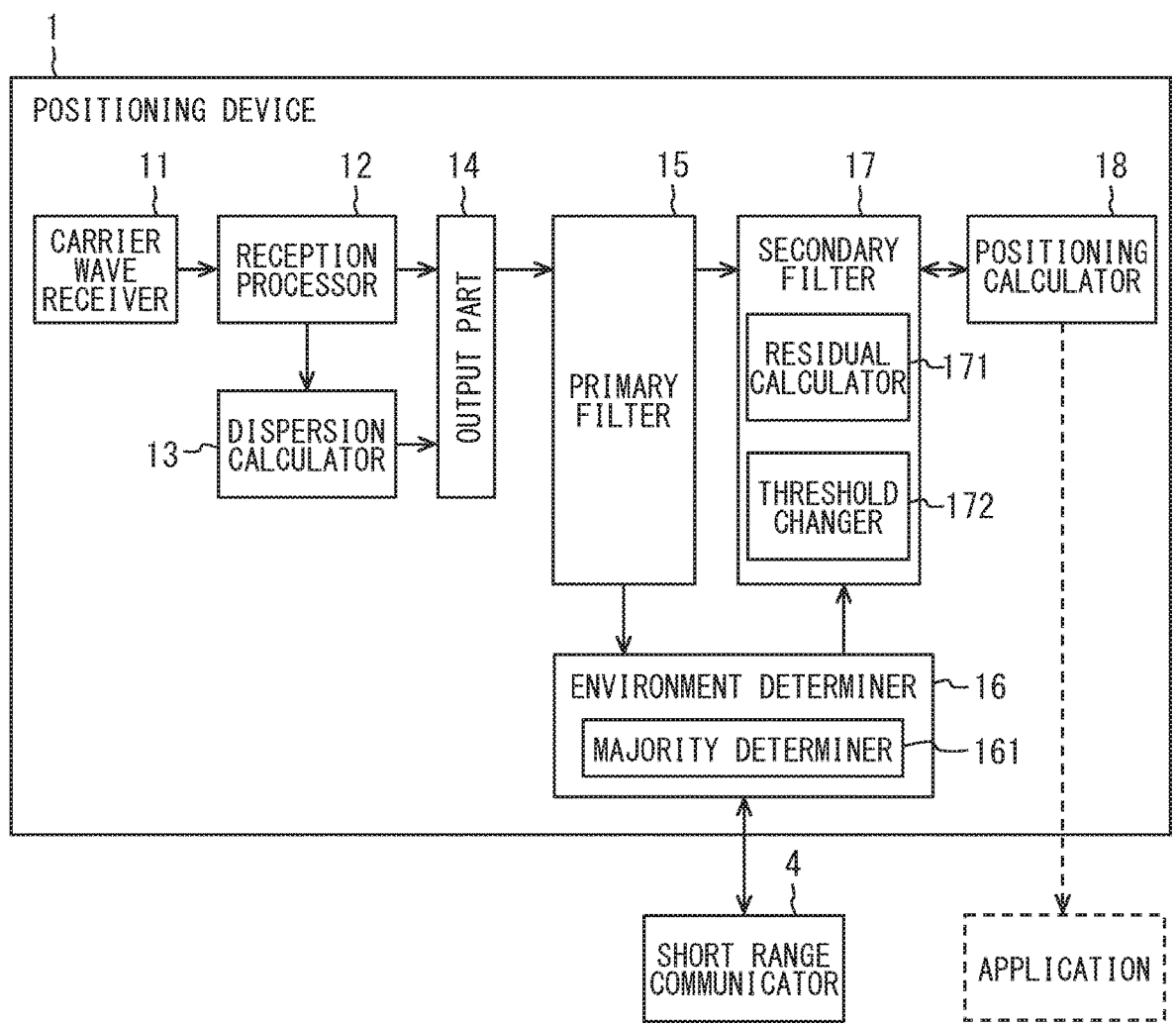
FIG. 8 is a block diagram showing an example of a schematic configuration of a positioning device according to Modification 2.

As shown in FIG. 8, when the positioning device 1 is connected to the short range communicator 4, which is a communication module for performing a direct wireless communication (hereinafter referred to as a short range communication) with another device existing in the periphery of the positioning device 1 using radio waves of a predetermined frequency band, so as to be able to mutually communicate with each other, the determination result of the surrounding environment of the other device may be acquired through the short range communicator 4, and the category of the current surrounding environment may be finally determined by majority decision. According to the configuration described above, the positioning device 1 can correct the error when only the subject device erroneously determines the category of the surrounding environment for some reason. In other words, the accuracy and reliability of the category to be finally used can be enhanced.

Hereinafter, a configuration based on the above concept will be described as Modification 2. In other words, the above-mentioned short range communication is communication not through a wide area communication network. As an example, the short range communicator 7 is a communication module for performing a direct communication with other vehicles existing in the vicinity of the subject vehicle Hv (that is, vehicle-to-vehicle communication) based on the fact that the positioning device 1 is mounted on the vehicle.

The frequency band used for the vehicle-to-vehicle communication is, for example, a 760 MHz band. In addition, a 2.4 GHz band, a 5.9 GHz band, or the like can be used. Any communication standard for realizing a vehicle-to-vehicle communication can be adopted. For example, the standard of WAVE (Wireless Access in Vehicular Environment) disclosed in IEEE1609 and the like can be adopted.

The short range communicator 4 as a communication module for the vehicle-to-vehicle communication is configured to be able to communicate with other vehicles existing within a radius of several hundred meters centered on the subject vehicle Hv. As an example, the short range communicator 4 is a communication module that provides a wireless communication function conforming to the vehicle-to-vehicle communication standard in which the communication range is about several hundred meters, but the present disclosure is not limited to the above example. As another embodiment, the short range communicator 4 may be a communication module that performs a communication (hereinafter referred to as a short-range communication) based on a predetermined short-range wireless communication standard in which the communication range is, for example, at most, about several tens of meters. For example, Bluetooth Low Energy (Bluetooth is a registered trademark), Wi-Fi (registered trademark), ZigBee (registered trademark), or the like, corresponds to the short-range wireless communication standard described above.

The short range communicator 4 broadcasts a determination result packet indicating category information (for example, category number) indicating the category determined by the environment determiner 16 of the subject device based on a request from the positioning device 1 (particularly, the environment determiner 16). When the determination result packet transmitted from another vehicle is received, data indicated in the determination result packet is provided to the positioning device 1. As a precondition, the environment determiner 16 according to Modification 2 generates a determination result packet every time the determination of the category of the surrounding environment is performed based on the deletion rate input from the primary filter 15, outputs the determination result packet to the short range communicator 4, and broadcasts the determination result packet.

The determination result packet is a communication packet including information indicating a determination result of the surrounding environment (for example, a category number), and position information as a calculation result of the positioning calculator 18. As a more preferable mode, the determination result packet includes information indicating a transmission time, a traveling speed, and a traveling direction of the communication packet in addition to the category number and the current position information.

Figure 9:
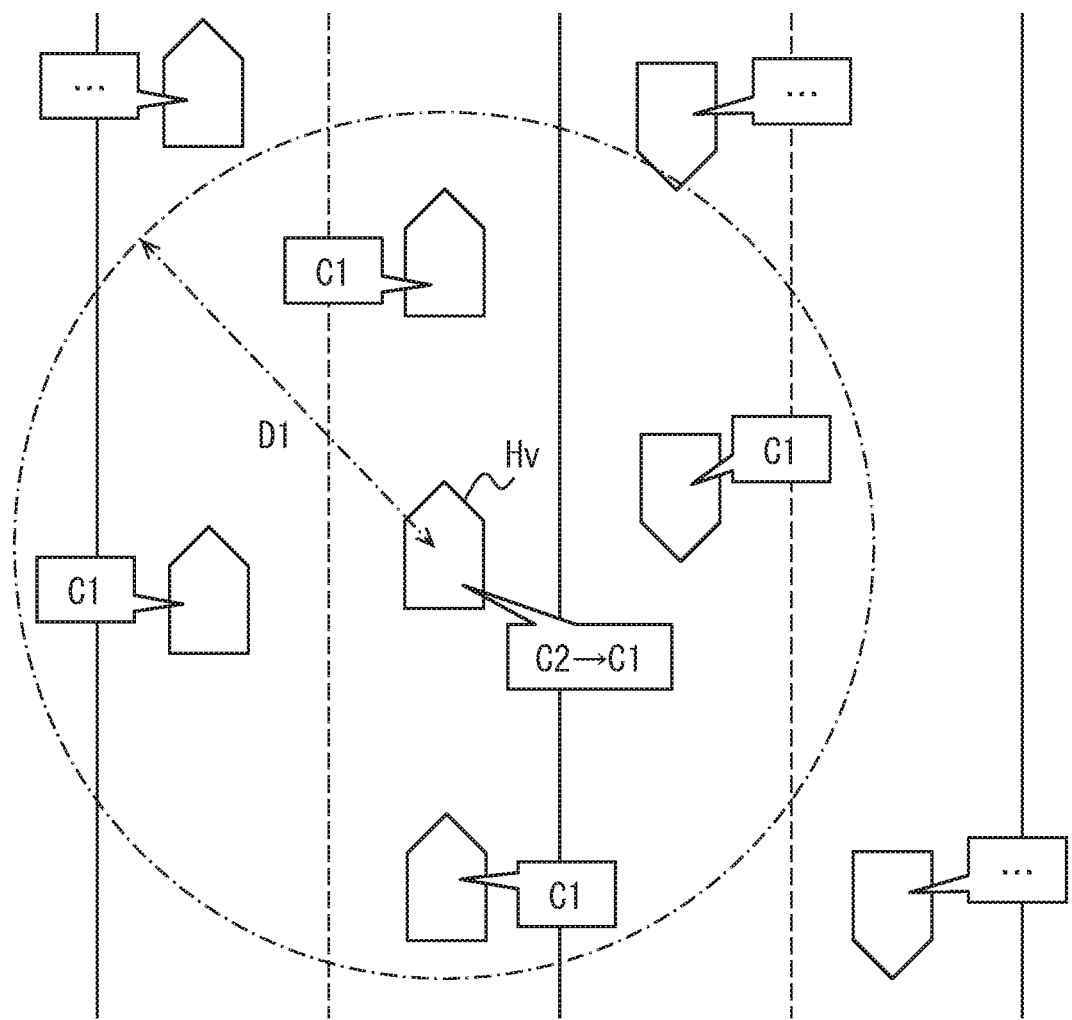
FIG. 9 is a diagram illustrating the operation of an environment determiner according to Modification 2.

As shown in FIG. 9, the environment determiner 16 in the present modification sequentially acquires determination results of other vehicles (hereinafter, surrounding vehicles) existing within a predetermined distance D1 from the subject vehicle Hv in cooperation with the short range communicator 4. In addition, the environment determiner 16 includes a majority determiner 161. The majority determiner 161 finally 10 determines which category the surrounding environment corresponds to by a majority decision using the respective determination results of the surrounding vehicle and the subject vehicle Hv.

For example, as shown in FIG. 9, when as the determination result of the surrounding vehicle, the determination result indicating that the surrounding environment is the first category C1 is the majority in the situation where it is determined that the surrounding environment of the subject vehicle is the second category C2, the majority determiner 161 finally determines that the surrounding environment is the first category C1. In other words, the determination result of the subject vehicle that the surrounding environment is the second category C2 is discarded, and the category of the surrounding environment is determined as the first category.

It is preferable that a distance D1 is set to a value sufficiently smaller than the distance that can be communicated between the vehicles, such as several tens of meters (for example, 15 m). This is because there is a high possibility that the surrounding environment of other vehicles traveling in a place distant from the subject vehicle Hv is different from the surrounding environment of the subject vehicle Hv. Among the other vehicles performing vehicle-to-vehicle communication, the other vehicle corresponding to the surrounding vehicle may be extracted with the use of the current position of the subject vehicle Hv and the current position of the transmission source vehicle. The transmission source vehicle whose current position is within the distance D1 from the subject vehicle Hv may be adopted as the surrounding vehicle. The positioning device 1 mounted on the subject vehicle Hv corresponds to a subject device, and the positioning device 1 mounted on the surrounding vehicle corresponds to a peripheral device.

According to the configuration of Modification 2, as described above, the positioning device 1 can correct the error when only the subject device 1 erroneously determines the category of the surrounding environment for some reason. As a result, the accuracy and reliability of the category to be finally used can be enhanced.

The majority determiner 161 may adopt the majority decision result in the surrounding environment only when the most frequent category, which is the determination result of the largest number of appearances (in other words, the majority) among the determination result of the surrounding vehicle and the determination result of the subject vehicle Hv, exceeds half of the total. This is because the fact that the most frequent category does not exceed half of the total means that the determination results of the respective vehicles (more specifically, the positioning devices 1) split, and the determination result of the majority is not necessarily the correct determination result. In other words, the determination accuracy of the surrounding environment can be enhanced by employing the determination result of the majority only when the determination result of the majority exceeds half of the total. In addition, even though the subject vehicle is able to correctly determine the surrounding environment, the possibility of adopting an erroneous determination result as a final category due to being induced by the determination result of the surrounding vehicle can be also reduced.

Figure 10:
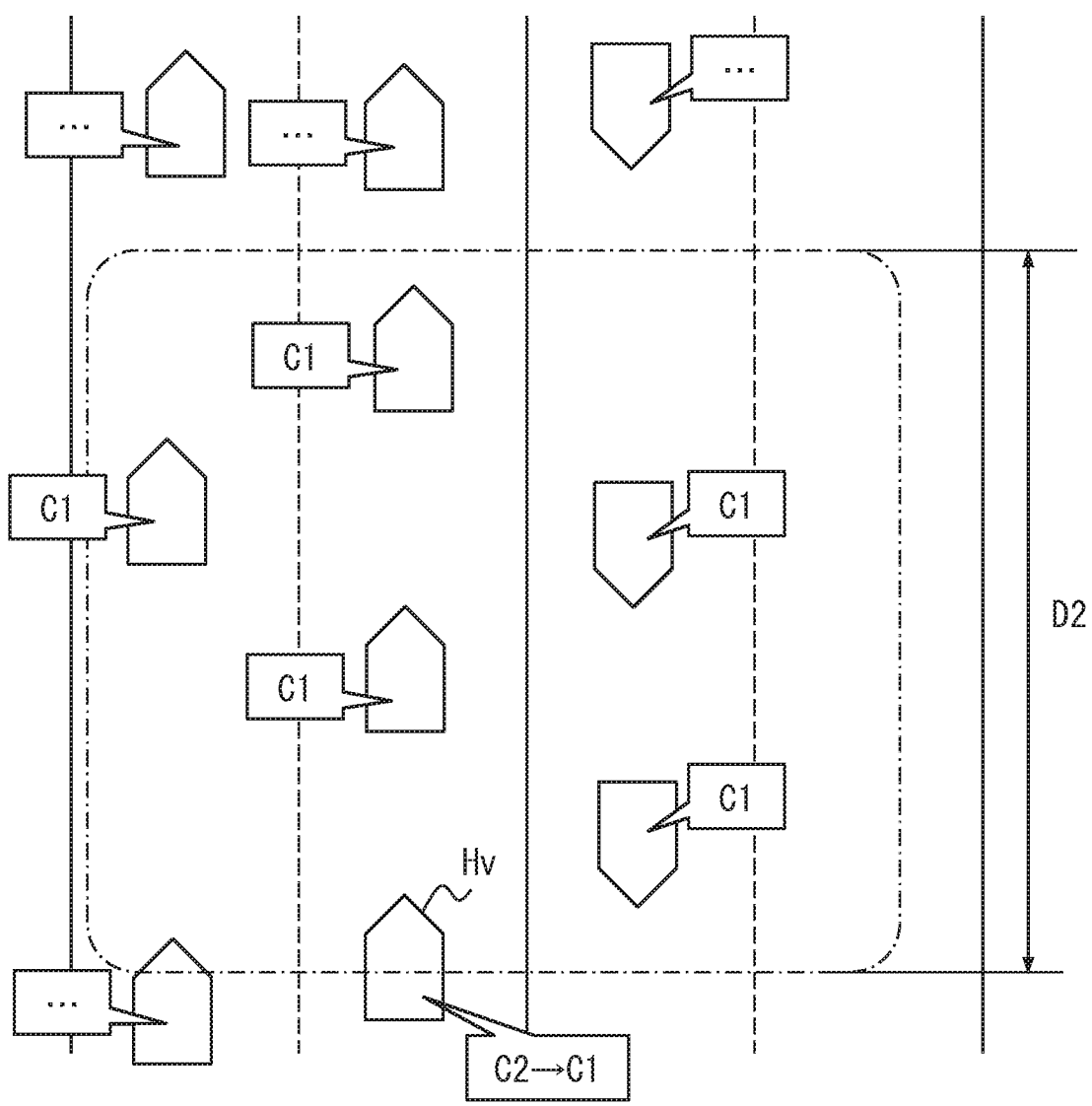
FIG. 10 is a diagram illustrating the operation of the environment determiner according to Modification 2.

In the configuration described above, a mode in which the final surrounding environment is determined by using the determination result of the other vehicle located within a distance D1 from the subject vehicle Hv is disclosed, but the present disclosure is not limited to the above example. As shown in FIG. 10, the final surrounding environment may be determined by using the determination result of the other vehicle which is in front of the subject vehicle Hv and within a distance D2 from the subject vehicle Hv among the vehicles which are performing the vehicle-to-vehicle communication (in other words, as a population).

The reason will be described below. The deletion rate R for determining the category changes according to the pseudo distance dispersion, which is a statistical index determined based on the observation data within a predetermined period of time in the past. Even if the actual surrounding environment changes, the change does not appear as a change in the deletion rate R until the pseudo distance dispersion exceeds a predetermined dispersion threshold. In other words, it takes time according to the number of pieces of data for calculating the pseudo distance dispersion before the actual change in the surrounding environment is reflected in the determination result of the environment determiner 16.

In view of the above property, there is a high possibility that the determination result of the other vehicle traveling in front of the subject vehicle Hv correctly determines the surrounding environment of the subject vehicle Hv more than the determination result of the other vehicle traveling behind the subject vehicle Hv. Therefore, the category of the final surrounding environment is configured to be determined with the use of the determination result of the other vehicle in front of the subject vehicle Hv and within a distance D2 from the subject vehicle Hv, thereby being capable of improving the determination accuracy of the category. The distance D2 may have the same value as that of the distance D1.

Further, for example, the category of the final surrounding environment may be determined with the use of only the determination result of the other vehicle having the same traveling direction as that of the subject vehicle Hv among the other vehicles traveling in front of the subject vehicle Hv and the determination result of the subject vehicle Hv.

Further, the surrounding environment is different between an expressway and a general road (hereinafter referred to as a road along the expressway) located under the highway. Naturally, the skyward view is better on the expressway, and the skyward view is worse on a road along the highway. Taking such an issue into consideration, it is preferable to determine the category of the final surrounding environment with the use of the determination result of the subject vehicle Hv of the other vehicle that is traveling on the same type of road as that of the subject vehicle Hv among the other vehicles traveling around the subject vehicle Hv. Whether the vehicle is traveling on a road of the same type as that of the subject vehicle Hv may be specified by sharing the type of the traveling road by the vehicle-to-vehicle communication, or may be determined based on height information included in the position information. Further, since a significant difference occurs in the traveling speed between the expressway and the general road, it can be determined whether the traveling speed is at the same level (for example, ±10 kilometers or less).

(Modification 3)

In the embodiment described above, the pseudo distance residual ΔD is employed as the error index value, but the present disclosure is not limited to the above example. The error index value may be a noise content that represents a ratio of noise to the positioning signal. The noise content may be a value obtained by dividing the variance of the noise by the variance of the signal, or a value obtained by taking a logarithm of the variance. The noise content is a parameter indicating that the smaller the value of the noise content, the smaller the possibility that the pseudo distance calculated based on the positioning signal contains an error. The noise content may be calculated as a reciprocal of the S/N ratio of the positioning signal.

The error index value may also be an elevation angle residual determined by subtracting the elevation angle from 90°. This is because the pseudo distance residual ΔD tends to be smaller as the elevation angle is closer to 90°, that is, as the elevation angle residual is smaller. The reciprocal of the elevation angle may be adopted as the elevation angle residual. The elevation angle residual may be a parameter having a smaller value as the elevation angle increases.

However, the pseudo distance residual ΔD directly represents the magnitude of the possibility that the pseudo distance contains an error rather than the noise content or the elevation angle residual. Therefore, it is preferable to use the pseudo distance residual ΔD as the error index value. The secondary filtering process may be performed with the use of any two or all of the three indices, such as the pseudo distance residual ΔD, the noise content, and the elevation angle residual, in combination.

The flowcharts or the processes of the flowcharts described in the present disclosure are configured by multiple sections (or steps), and each section is represented as S101, for example. Furthermore, each section may be divided into multiple sub-sections, while the multiple sections may be combined into one section. In addition, each section configured in this manner may be referred to as a circuit, a device, a module, or a means.

Although the present disclosure has been described in accordance with the examples, it is understood that the present disclosure is not limited to such examples or structures. The present disclosure encompasses various modifications and variations within the scope of equivalents. In addition, various combinations and configurations, as well as other combinations and configurations that include only one element, more, or less, fall within the scope and spirit of the present disclosure.

What is claimed is:

1. A positioning device comprising:
   a signal receiver configured to receive a plurality of positioning signals respectively transmitted from a plurality of positioning satellites;
   an environment index value calculator configured to sequentially calculate, as an index value for determining whether in a multipath environment, at least one of a Doppler shift amount and a pseudo distance of each of the positioning satellites based on each of the positioning signals received by the signal receiver;
   a dispersion calculator configured to calculate an index value dispersion indicating a degree of variation of the index value calculated by the environment index value calculator for each of captured satellites which are the positioning satellites from which the positioning signals are received by the signal receiver;
   a primary selector configured to determine a non-use satellite not to be used in a positioning calculation processing among the captured satellites based on the index value dispersion calculated by the dispersion calculator for each of the captured satellites;
   an environment determiner configured to determine whether a surrounding environment is an environment in which a multipath is likely to occur based on a deletion rate which is a ratio of the number of the captured satellite set as the non-use satellite by the primary selector to a total number of the captured satellites;
   a condition changer configured to change a condition of the captured satellites to be used in the positioning calculation processing based on a determination result of the environment determiner; and
   a positioning calculator configured to perform the positioning calculation processing using the positioning signals from the positioning satellites that satisfy the condition set by the condition changer.

2. The positioning device according to claim 1, wherein
   a plurality of categories is set in stages in advance according to a likelihood of occurrence of the multipath,
   the categories include at least an open sky category, which is a category corresponding to an open sky environment in which the multipath is least likely to occur, and an urban category, which is a category corresponding to an urban area in which the multipath is most likely to occur,
   the environment determiner determines which of the categories the surrounding environment corresponds to based on the deletion rate, and
   the condition changer is configured to set the condition of the captured satellites to be used in the positioning calculation processing to be stricter when the surrounding environment determined by the environment determiner corresponds to the category in which the multipath is less likely to occur.

3. The positioning device according to claim 2, further comprising:
   an error index value calculator configured to calculate, for each primary remaining satellite which is the captured satellite not set as the non-use satellite by the primary selector, an error index value representing a magnitude of a possibility that a pseudo distance calculated based on the positioning signal transmitted from the captured satellite includes an error, wherein
   the condition of the captured satellite used in the positioning calculation processing is that the error index value is less than a filtering threshold set by the condition changer; and
   the condition changer is configured to set the filtering threshold to a smaller value in a state where the surrounding environment determined by the environment determiner corresponds to the category in which the multipath is less likely to occur.

4. The positioning device according to claim 3, wherein
   the error index value is a pseudo distance residual representing a magnitude of a difference between a straight line distance from the positioning device to each of the captured satellites determined according to position coordinates of the positioning device and position coordinates of each of the captured satellites, and the pseudo distance of each of the captured satellites.

5. The positioning device according to claim 3, wherein
   a plurality of candidate values is set in stages as the candidate values of the filtering threshold, the condition changer sets the filtering threshold to a smallest candidate value among the candidate values when the environment determiner determines that the surrounding environment corresponds to the open sky category, and the condition changer sets the filtering threshold to a largest candidate value among the candidate values when the environment determiner determines that the surrounding environment corresponds to the urban category.

6. The positioning device according to claim 3, wherein a plurality of candidate values respectively associated with the categories is set as the candidate values of the filtering threshold, and the positioning satellites include at least one quasi-zenith satellite that orbits a quasi-zenith orbit for an area in which the positioning device is used, the positioning device further comprises a quasi-zenith capture determiner configured to determine whether the quasi-zenith satellite is captured based on an elevation angle of each of the captured satellites or transmission source information indicated in the positioning signal of each of the captured satellites, and the condition changer sets the filtering threshold to be the candidate value associated with the category determined by the environment determiner when the quasi-zenith capture determiner determines that the positioning signal from the quasi-zenith satellite is not captured, and sets the filtering threshold to be a value smaller than the candidate value associated with the category determined by the environment determiner when the quasi-zenith capture determiner determines that the positioning signal from the quasi-zenith satellite is captured.

7. The positioning device according to claim 2, wherein a subject device as the positioning device is configured to be mutually communicably connected to a short range communicator for directly communicating with a peripheral device which is another positioning device existing within a predetermined distance from the subject device, the environment determiner is configured to broadcast category information indicating the category determined by the environment determiner of the subject device based on the deletion rate to the peripheral device in cooperation with the short range communicator, and the positioning device further comprises a majority determiner that acquires the category of the surrounding environment determined by the peripheral device in cooperation with the short range communicator and finally determines which of the categories the surrounding environment corresponds to according to a majority decision using determination results of the peripheral device and the subject device.

8. The positioning device according to claim 7, wherein when a number of appearances of a most frequent category, which is the determination result having a largest number of appearances among the determination results of the peripheral device and the subject device, exceeds half of a total, the majority determiner determines that the surrounding environment corresponds to the most frequent category, and when the number of appearances of the most frequent category does not exceeds half of the total, the majority determiner employs the determination result of the subject device as a final surrounding environment.

9. The positioning device according to claim 1, wherein part or all of the signal receiver, the environment index value calculator, the dispersion calculator, the primary selector, the environment determiner, the condition changer, and the positioning calculator are realized by software executed by a processor, or hardware, or cooperation of the software and the hardware.

10. A positioning device comprising a processor and a memory, the memory storing instructions configured to, when executed by the processor, cause the processor to:

receive a plurality of positioning signals respectively transmitted from a plurality of positioning satellites;

sequentially calculate, as an index value for determining whether in a multipath environment, at least one of a Doppler shift amount and a pseudo distance of each of the positioning satellites based on each of the positioning signals that are received;

calculate an index value dispersion indicating a degree of variation of the index value calculated for each of captured satellites which are the positioning satellites from which the positioning signals are received;

determine a non-use satellite not to be used in a positioning calculation processing among the captured satellites based on the index value dispersion calculated for each of the captured satellites;

determine whether a surrounding environment is an environment in which a multipath is likely to occur based on a deletion rate which is a ratio of the number of the captured satellite set as the non-use satellite to a total number of the captured satellites;

change a condition of the captured satellites to be used in the positioning calculation processing based on a determination result of the surrounding environment; and perform the positioning calculation processing using the positioning signals from the positioning satellites that satisfy the condition.

11. A positioning method comprising:

receiving a plurality of positioning signals respectively transmitted from a plurality of positioning satellites;

sequentially calculating, as an index value for determining whether in a multipath environment, at least one of a Doppler shift amount and a pseudo distance of each of the positioning satellites based on each of the positioning signals that are received;

calculating an index value dispersion indicating a degree of variation of the index value calculated for each of captured satellites which are the positioning satellites from which the positioning signals are received;

determining a non-use satellite not to be used in a positioning calculation processing among the captured satellites based on the index value dispersion calculated for each of the captured satellites;

determining whether a surrounding environment is an environment in which a multipath is likely to occur based on a deletion rate which is a ratio of the number of the captured satellite set as the non-use satellite to a total number of the captured satellites;

changing a condition of the captured satellites to be used in the positioning calculation processing based on a determination result of the surrounding environment; and performing the positioning calculation processing using the positioning signals from the positioning satellites that satisfy the condition.

* * * * *